Feb. 16, 1971 A. BURGERT 3,564,435

FREQUENCY DISCRIMINATOR OF SIMPLIFIED CONSTRUCTION

Filed March 11, 1968 2 Sheets-Sheet 1

United States Patent Office 3,564,435

Patented Feb. 16, 1971

3,564,435
FREQUENCY DISCRIMINATOR OF SIMPLIFIED CONSTRUCTION

Albert Burgert, Arcueil, France, assignor to Compagnie Generale d'Electricite

Filed Mar. 11, 1968, Ser. No. 712,087
Claims priority, application France, Mar. 10, 1967, 98,323
Int. Cl. H03d 3/26
U.S. Cl. 329—140 14 Claims

ABSTRACT OF THE DISCLOSURE

Frequency discriminator with a single coil having a first end connected to ground, a second end connected to a first terminal of a differential detection network, a first tap connected to the second terminal of said network, and a middle tap connected between said second end and said first tap, which is connected to a source of variable frequency current, including a first tuning condenser connected between said second end and said first tap, and a second tuning condenser connected between said middle tap and ground.

Figure 1:
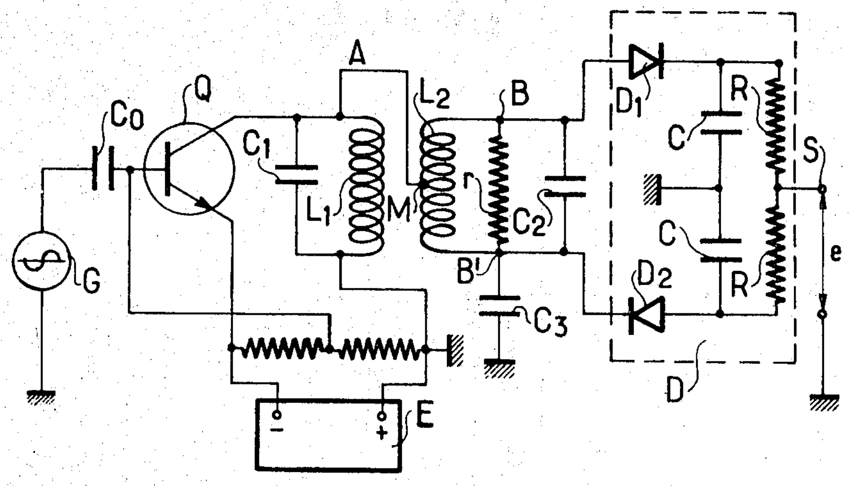

The invention relates in general to frequency discriminators, and more particularly to a simplified frequency discriminator, the construction of which requires fewer components than equivalent frequency discriminators known heretofore, and does not necessitate critical adjustemnts. In a first embodiment, the discriminator operates within a comparatively narrow band, for example, for a relative freqeuncy excursion around a carrier $$f_o \pm \Delta f / F_1$$

of less than $\pm 1/50$ at the carrier frequency. In a second embodiment it may have a relative excursion of the order of $\pm 1/5$ of the carrier frequency and thus be of relatively side band type.

Known frequency discriminators comprise a current vectorial-composition network, and a differential detection network. The current composition network contains a coil so connected that it provides two currents in phase opposition in each half of the coil and a second connection provides a third current which, at a reference frequency or matching frequency $f_o$, is in leading quadrature with one of the said first currents and in trailing quadrature with the other said current, while, at a frequency lower than the matching frequency, the two currents in opposition rotate their common direction in a certain sense relative to the third current, and at a higher frequency than the said matching frequency, their common direction rotates in the other sense relative to the third current.

The differential detection network is connected to receive the output of the vectorial-composition network and operates to deliver zero voltage at the matching frequency $f_o$, and, within a range lower than the width $\Delta f < f_m$ a voltage having a first polarity, the intensity of which increases substantially linearly with $\Delta f$, and within a higher symmetrical range, a voltage of the opposite polarity.

Known discriminators have generally a composition network with at least three coils of which one is center-tapped, and at least two capacitances. These coils are costly to manufacture, requiring a generally critical adjustment of the inductance and inter-coil coupling. Thus, any saving that can be made in the coils is capable of providing a substantial reduction in the cost of the frequency discriminator. In addition, a simpler structure improves reliability.

A frequency discriminator in accordance with the present invention has a vertical composition network provided with a pair of input terminals between which the modulated signal to be discriminated is applied, one end of which is effectively grounded, and a pair of output terminals connected to the input side of a differential detection network from which a demodulated output singal is to be obtained; the input terminals being connetced by a parallel input circuit composed of an inductive arm shunted by a matching capacitive arm and having the ungrounded input terminal connected to the center of an inductive leg connected in parallel with a matching capacitive leg across the pair of output terminals, the inductive leg being inductively coupled to at least part of the inductive arm of the input circuit.

An advantage of the discriminator of the present invention is that all of the inductance necessary in the inductive arm and by thereof can be provided by only two coils and, if only a broad band discriminator is required, a single coil with appropriate tappings may suffice.

Figure 2A:
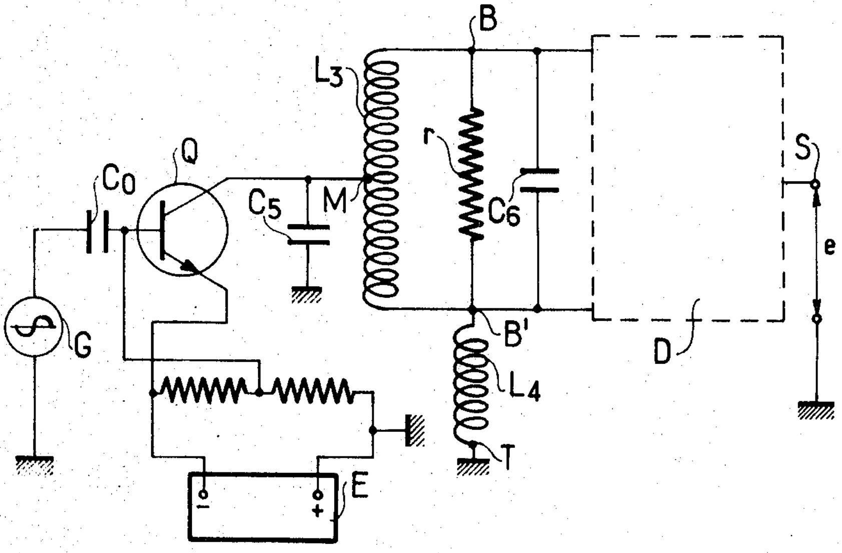
Figure 2B:
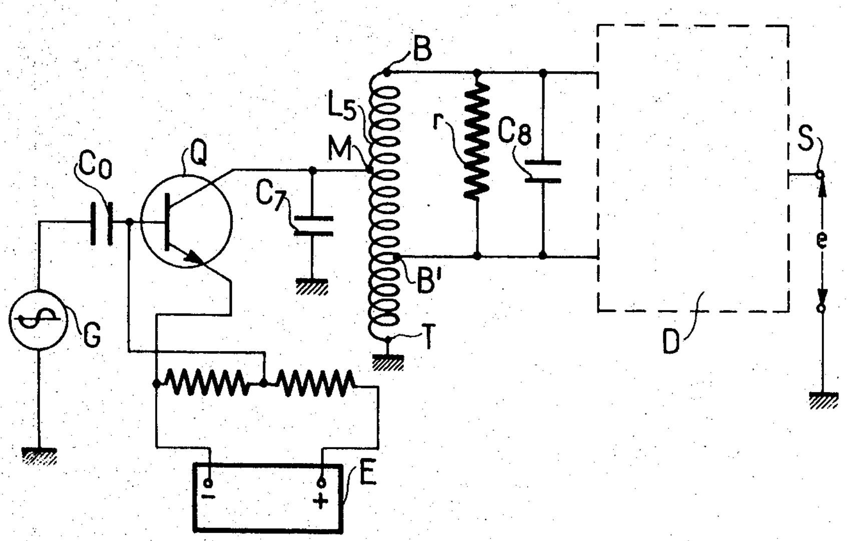
Figure 3:
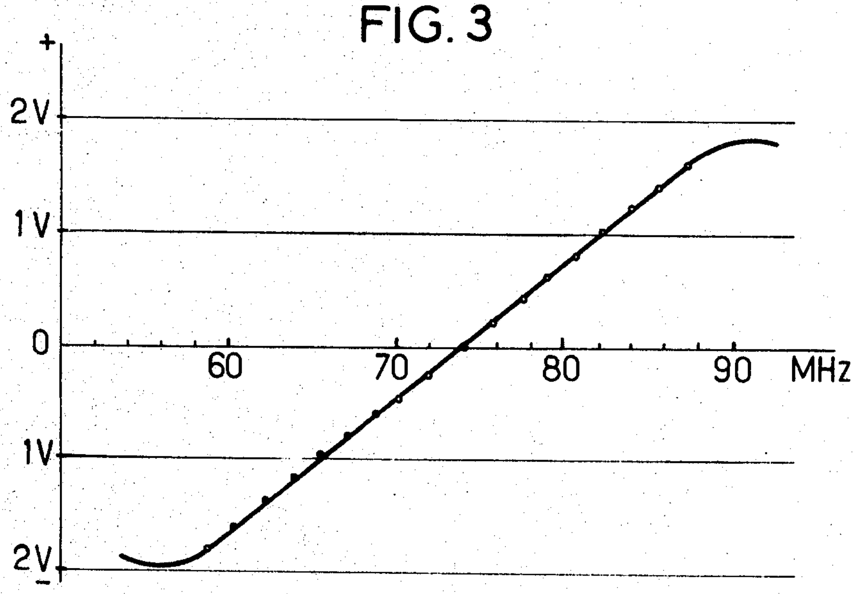

The invention will now be described in more detail, by way of examples, with reference to the accompanying drawings, in which:

FIG. 1 is a circuit diagram of a freqeuncy discriminator having a narrow band characteristic;

FIG. 2*a* is a circuit diagram of a second frequency discriminator having a wide-band characteristic;

FIG. 2*b* is a modified form of the frequency discriminator circuit shown in FIG. 2*a*; and FIG. 3 is a graph illustrating the frequency/voltage characteristic of the discriminator.

Referring to FIG. 1 an NPN amplifier transistor Q is supplied by a unidirectional current source E and an alternating freqeuncy signal to be demodulated from a source represented by an alternator G, applied to its base through a coupling capacitor $C_0$. The base is also held at a potential between ground and the transistor emitter potential by a connection extending to a resistance chain connected across the source E. Current from the collector of the transistor is fed to a vectorial-composition network.

The vectorial-composition network has a pair of input terminals one of which is connected to the collector of transistor Q and the other of which is connetced to ground. Connetced between the pair of input terminals is a parallel input circuit having an inductive arm $L_1$ shunted by a matching capacitive arm $C_1$.

The input terminal A is connected to a center tap M of a second coil $L_2$ inductively coupled to the inductive arm $L_1$. The coil $L_2$ forms an inductive leg connected between a pair of output terminals B and B′ for the composition network, the output terminals being shunted by a damping resistor $r$ and a matching capacitor $C_2$. The output terminal B′ is grounded for alternating signals by way of a capacitor $C_3$.

A differential detecting network shown within the box D in broken outline and of known type is connected between the terminals B and B′ and comprises two diodes $D_1$ and $D_2$. Two serially connected capacitors C of equal value are connected between the cathode of diode $D_1$ and the anode of diode $D_2$ and the common point of the capacitors C are connected through a pair of serially connected resistors R of equal value. The common terminal of the resistors R provides, with respect to ground, a demodulated output signal from the discriminator.

The discriminator of FIG. 1 gives good results for a frequency excursion in a comparatively narrow band. The circuit is not, however, satisfactory for operation over a relatively wide band of frequencies.

In order to demonstrate this, a suitable theory will be used, relating to band passes with two matched, coupled circuits, such as are known in high frequency circuit techniques. The pass band of wide band circuit of mutual inductance $q$ tuned to the frequency $f_0$ with 3 dB damping, is given by:

$$B = f_o / q \quad (1)$$

The coupling coefficient $k$ of a network with two coupled circuits giving optimum detection linearity, is:

$$k=2/q \quad (2)$$

It is well known that in a capacitive coupling, the coupling capacitance is proportional to the wanted coupling coefficient:

$$C_3=k.r \quad (3)$$

where $r$ is a constant.

Also, if $l$ is an impedance parallel to the matching circuit, it follows: $q=l/Lw_0=lCw_0$, and therefore $$B=1/2\pi lC \quad (4)$$

It follows that if B is to be increased: $q$ must be reduced—see Equation 1; therefore $k$ must be increased—see Equation 2; this leads to an increase in $C_3$—see Equation 3; but this results in a drop in B—see Equation 4 so that incompatibilities are encountered.

For operation within a very wide band, another form of coupling must therefore be adopted. FIG. 2*a* shows a relatively broad-band discriminator. An amplifying input transistor Q is once again used and it has its emitter and collector circuits connected in the same manner as the embodiment shown in FIG. 1. The collector of the transistor Q is connected directly to the center-point M of a coil $L_3$ providing with its opposite ends a pair of output terminals B and B′ connected to the differential detection network D and shunted by the damping resistor $r$ and a matching capacitor $C_6$. A direct current circuit to ground extends from the center tap M through the lower half of the coil $L_3$ and through a second coil $L_4$ which is completely separate and not inductively coupled to the coil $L_3$.

In the figure it will be apparent that the input circuit of the composition network is comprised by the capacitor $C_5$ and the parallel inductive arm formed by the lower half of the coil $L_3$ and the coil $L_4$. The pair of input terminals of the composition network are therefore the points M and T. The entire length of coil $L_3$ is matched to the capacitor $C_6$ across the output terminals B and B′.

FIG. 2*b* shows a modification of the circuit shown in FIG. 2*a*, corresponding parts being similarly referenced. In the circuit of FIG. 2*b* a single coil is used to provide the inductive arm of the input circuit and also the inductive leg extending between the output terminals of the composition network. The single coil is referenced $L_5$ and has ends B and T intermediate which are a pair of tapping points M and B′ of which point M is centered mid-way between the pair of output terminals leading to the differential detection network and referenced B and B′. The capacitor $C_7$ is a matching capacitor and is effectively in parallel with the inductive arm of the input circuit formed by the portion of the coil between the terminals M and T. Likewise a matching capacitor $C_8$ is shunted across the output pair of terminals B and B′.

FIG. 3 gives, by way of example, the operating characteristic $e$ of $Q(\Delta f)$ for a wide band discriminator with a construction according to FIG. 2*a*, and having the following values for the parameters.

$F_0$—74 mh.₃.
$q$—4.
$r$—450Ω.
$C_5$—17.2 pf.
$C_6$—17.2 pf.
$L_3$—270 nh.
$L_4$—135 nh.

In FIG. 3 voltage is plotted along the ordinate and applied frequency modulated signal is plotted along the abscissa.

I have shown and described several embodiments in accordance with the present invention. It is understood that the same is not limited thereto but is susceptible of numerous changes and modifications as known to a person skilled in the art.

In the claims:

1. A frequency discriminator having a vectorial composition network provided with a pair of input terminals between which the modulated signal to be discriminated is applied, one of which input terminals is effectively grounded, and a pair of output terminals connected to the input side of a differential detection network from which a demodulated output signal is to be obtained; wherein said input terminals are connected by a parallel input circuit composed of an inductive arm shunted by a first matching capacitive arm and having the other of said input terminals connected to an inductive leg connected with a second matching capacitive member to said pair of output terminals, the leg being coupled to ground through at least part of the inductive arm of the input circuit.

2. A frequency discriminator as defined in claim 1 and having a relatively wide band frequency characteristic, in which the inductive arm comprises one half of the inductive leg and a coil connected thereto, which coil is connected between one of the output terminals of the composition network and ground.

3. A frequency discriminator as defined in claim 1 and having a relatively wide band frequency characteristic, in which a single coil having spaced tappings forms the inductive arm and the inductive leg, one end of the coil being grounded and the other end providing one of said output terminals.

4. A frequency discriminator as defined in claim 1 further including a signal amplifier connected to the inductance arm, and a damping resistor shunting the inductive leg.

5. A frequency discriminator as defined in claim 4, in which the signal amplifier comprises an NPN transistor having its emitter negatively biased by a source of negative potential with respect to ground and its base held at a voltage between the emitter voltage and ground and connected to a modulated signal source through a coupling capacitor.

6. A frequency discriminator as defined in claim 1, in which the inductive leg and the inductive arm are composed of a maximum of two coils.

7. A frequency discriminator comprising a vectorial composition network including a winding, a first capacitive tuning element connected between a first tap of the winding and one end thereof ad a second capacitive tuning element connected between a second tap of the winding, between said first tap and said one end thereof, and the other end of said winding, and a differential detecting network connected between said second tap and said other end of said winding.

8. A frequency discriminator as defined in claim 7 wherein said one end of said winding is grounded, and further including input means for providing a modulated input signal to be discriminated between said first tap of said winding and ground.

9. A frequency discriminator as defined in claim 8 wherein said input means includes a signal amplifier connected to said one tap of said winding, and further including a damping resistor connected in parallel with said second capacitive tuning element.

10. A frequency discriminator as defined in claim 9 wherein said signal amplifier comprises a direct current source and an NPN transistor connected to said direct current source and having its emitter held negative with respect to ground and its base held at a voltage between the emitter voltage and ground, the base of said transistor being connected to said means providing a modulated input signal.

11. A frequency discriminator as defined in claim 1, wherein the other of said input terminals is connected to the center of said inductive leg, said inductive leg and said second matching capacitive member being connected in parallel across said pair of output terminals.

12. A frequency discriminator as defined in claim 1, wherein the other of said input terminals is connected to one end of said inductive arm, said second matching capacitive member being connected in parallel with said inductive leg and a part of said inductive arm across said pair of output terminals.

13. A frequency discriminator as defined in claim 12, wherein a remaining portion of said inductive arm is inductively isolated from said part of said inductive arm and sad inductive leg.

14. A frequency discriminator as defined in claim 12, wherein said part of said inductive arm and said inductive leg are formed by a single coil.

References Cited

UNITED STATES PATENTS

| | | | |
|---|---|---|---|
| 2,603,748 | 7/1952 | Bell | 329—129 |
| 3,063,019 | 11/1962 | DeWaard et al. | 329—140X |
| 3,217,263 | 11/1965 | Starreveld et al. | 307—233X |
| 3,290,608 | 12/1966 | Gschwandtner | 329—129X |

ALFRED L. BRODY, Primary Examiner

U.S. Cl. X.R.

307—233; 325—349; 329—129